(12) United States Patent
Bouchard

(10) Patent No.: US 8,419,364 B2
(45) Date of Patent: Apr. 16, 2013

(54) FAN WITH AN ARRANGEMENT OF DETECTING DEGRADATION OF THE BEARINGS

(75) Inventor: Laurent Bouchard, Plaisance du Touch (FR)

(73) Assignee: Technofan, Blagnac (FR)

( * ) Notice: Subject to any disclaimer, the term of this patent is extended or adjusted under 35 U.S.C. 154(b) by 1299 days.

(21) Appl. No.: 12/128,025

(22) Filed: May 28, 2008

(65) Prior Publication Data

US 2008/0298952 A1 Dec. 4, 2008

(30) Foreign Application Priority Data

May 29, 2007 (FR) ...................................... 07 55303

(51) Int. Cl.
*F04D 15/02* (2006.01)
*F04D 29/056* (2006.01)

(52) U.S. Cl.
USPC ............. 416/61; 416/174; 415/118; 415/229; 417/32; 417/63; 384/448

(58) Field of Classification Search .................... 415/47, 415/49–50, 118, 229; 416/39, 61, 174; 417/1, 417/32, 63, 423.12; 73/7, 9, 865.9, 866; 384/448; 374/141, 153, 163, 179, 208, 1, 374/4, 57
See application file for complete search history.

(56) References Cited

U.S. PATENT DOCUMENTS

| | | | | |
|---|---|---|---|---|
| 5,433,525 | A * | 7/1995 | El-Ibiary | 374/141 |
| 6,377,876 | B1 | 4/2002 | Hedeen | |
| 6,948,856 | B2 * | 9/2005 | Takizawa et al. | 384/448 |
| 2003/0042362 | A1 | 3/2003 | Ehrick | |
| 2003/0115977 | A1 * | 6/2003 | Holweg et al. | 73/865.9 |
| 2004/0036621 | A1 | 2/2004 | Morita | |
| 2005/0286823 | A1 * | 12/2005 | Singh et al. | 384/448 |
| 2008/0050058 | A1 * | 2/2008 | Filbry | 384/448 |

FOREIGN PATENT DOCUMENTS

| | | |
|---|---|---|
| EP | 1275851 A1 | 1/2003 |
| WO | WO-2006/042843 A2 * | 4/2006 |

* cited by examiner

*Primary Examiner* — Christopher Verdier
(74) *Attorney, Agent, or Firm* — Sughrue Mion, PLLC

(57) ABSTRACT

The fan has an arrangement for monitoring the ageing of at least one of its bearing, the arrangement including a reference ambient temperature sensor and a processing circuit for comparing the temperature difference between the temperature measured by the temperature sensor or by each temperature sensor fitted directly on the corresponding bearing and the temperature measured by the reference temperature sensor with a first predetermined value.

7 Claims, 2 Drawing Sheets

FAN WITH AN ARRANGEMENT OF DETECTING DEGRADATION OF THE BEARINGS

TECHNICAL FIELD

The present invention relates to a fan of the type having a support structure, an impeller supported by a shaft coupled to a drive motor, and at least one ball bearing interposed between the shaft and the support structure, the fan having means of monitoring the ageing of the bearings.

BACKGROUND TO THE INVENTION

The ventilation circuits of aircraft incorporate fans for circulating air in the ventilation ducts. These fans rotate at high speed and must be highly reliable. To meet these requirements, the shaft supporting the fan impeller is supported on two ball bearings. These bearings are lubricated to prevent their heating and rapid destruction.

The degradation of a ball bearing causes the fan to produce fumes and odours which are dispersed into the aircraft cabin. It is therefore useful to be able to detect such a degradation of a fan bearing rapidly, and preferably before the fan produces fumes and odours.

SUMMARY OF THE INVENTION

The object of the invention is to propose a fan enabling any degradation of bearings to be detected rapidly and at low cost before the bearings cause the production of fumes or odours.

For this purpose, the invention proposes a fan of the aforesaid type, wherein the means for monitoring the ageing include:
  a temperature sensor fitted on at least one bearing;
  a processing circuit connected to the temperature sensor and capable of providing an indicator representing the measured temperature and of evaluating the indicator, or each indicator, with respect to at least one predetermined criterion, and wherein the temperature sensor, or each temperature sensor, is fitted directly on a bearing race in contact with the support structure.

In specific embodiments, the fan can have one or more of the following features, considered individually or in all combinations:
  the measurement sensor is a thermocouple;
  the fan has a plurality of bearings interposed between the shaft and the support structure, and the monitoring means include a temperature sensor placed on each bearing;
  the processing circuit includes means of comparing the temperature measured by the temperature sensor, or by each temperature sensor, with a predetermined threshold value;
  the predetermined threshold value is in the range from 140° C. to 200° C.;
  the means of monitoring the ageing include a reference ambient temperature sensor, and the processing circuit includes means of comparing the temperature difference between the temperature measured by the temperature sensor, or by each temperature sensor, and the temperature measured by the reference ambient temperature sensor with a predetermined threshold value;
  the predetermined threshold value is in the range from 40° C. to 80° C.; and
  the reference ambient temperature sensor is placed in the vicinity of the fan drive motor.

BRIEF DESCRIPTION OF DRAWINGS

The invention will be more clearly understood with the aid of the following description, provided solely by way of example, which refers to the appended figures, in which.

DESCRIPTION OF PREFERRED EMBODIMENTS

Figure 1:
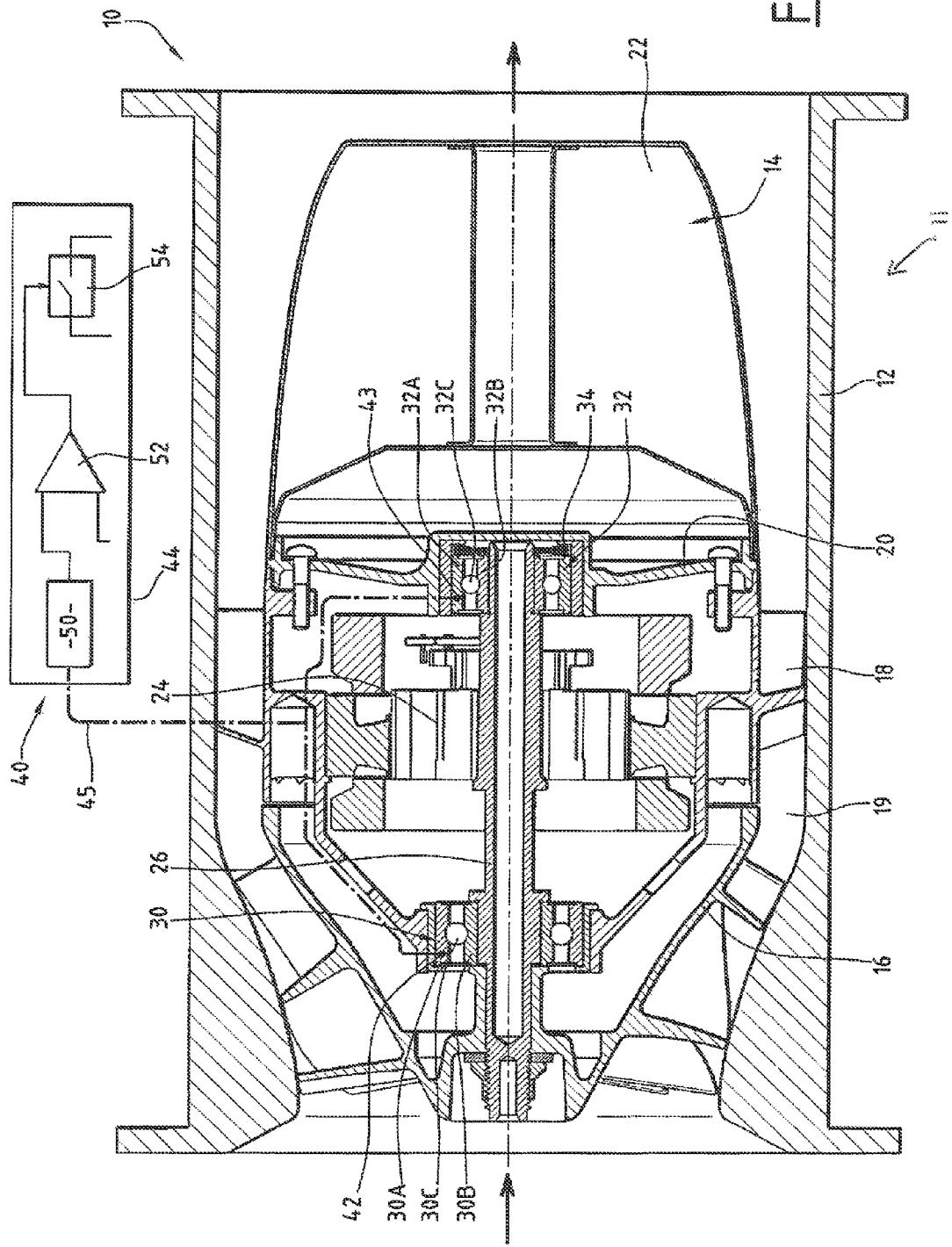
FIG. 1 is a longitudinal sectional view of a fan according to the invention.

The fan 10 shown in FIG. 1 is intended to be fitted in a ventilation circuit of an aircraft. It includes a support structure 11 comprising, for example, a tubular outer passage 12 and a hub 14 positioned inside the passage, an impeller 16 being mounted rotatably about the hub.

The hub 14 is connected to the passage 12 by transverse arms 18, thus delimiting an annular stream 19 between the tubular passage 12 and the hub 14.

The hub 14 has a frame 20 supporting a fairing 22. The tubular passage 12 is connected rigidly to the frame 20 to form the support structure.

An electric motor 24 is supported by the chassis and housed inside the fairing 22. It is positioned in line with the axis of the fan. The motor 24 has a shaft 26 which carries the impeller 16 at its end. In the illustrated embodiment, the impeller 16 matches the shape of the hub 14. The impeller is positioned at the end of the hub where the air is sucked in.

The rotor of the motor is fixed to the shaft 26, while the stator of the motor is fixed to the frame 20.

The shaft 26 of the motor is supported by two ball bearings 30 and 32.

The bearings are positioned one on each side of the motor 24, a bearing 30 called the front bearing being positioned between the motor 24 and the impeller 16, while the other bearing 32, called the rear bearing, is positioned at the opposite end of the motor 24 from the impeller 16.

In a known way, each bearing has an outer race 30A, 32A fixed with respect to rotation to the frame 20, and an inner race 30B, 32B fixed with respect to rotation to the shaft 26, with bearing elements, for example balls 30C, 32C, interposed between the two races.

A ball retaining cage, formed from a cylindrical shell pierced with housings to receive the balls, ensures that the balls are equally distributed and correctly positioned between the two races.

The rear bearing 32 is axially loaded by spring washers 34 positioned around the shaft 26 and fitted between the outer race 32A of the bearing and the frame 20. These spring washers act as springs to push the outer race of the bearing towards the impeller 16.

The dimensions of the front bearing 30 are larger than those of the rear bearing 32. This is because the bearing 30 is subjected to both the force of the spring 34 and the resultant aerodynamic thrust of the impeller 16.

According to the invention, the fan has means 40 for monitoring the ageing of the bearings.

These means preferably comprise a bearing temperature measurement sensor 42, 43 for each bearing 30, 32. Each sensor 42, 43 is fitted directly on the bearing 30, 32. It is preferably placed on the outer race 30A, 32A of the bearing, in other words the fixed race in contact with the structure of the support 11.

In a preferred embodiment, the sensor is a thermocouple.

The means 40 for monitoring the ageing of the bearings also include a processing circuit 44 connected to the sensors 42, 43.

In the illustrated embodiment, the processing circuit 44 is placed outside the air stream, in such a way that the sensors 42, 43 are connected to the processing circuit by conductors 45 extending along the support structure and passing through the annular air stream 19 through the transverse arms 18.

The processing circuit includes a module 50 for calculating a temperature T for each bearing.

Finally, the processing circuit includes a comparator 52 for comparing, for each bearing, the temperature T calculated by the module 50 with a predetermined threshold value indicated by $T_1$, in order to supply at its output two values representing the condition of the fan bearings, namely a first value indicating that the fan is in a good condition, and a second value indicating an alarm requiring the immediate stopping of the fan motor because of an imminent or actual rupture of one of the bearings. The threshold value is preferably in the range from 140° C. to 200° C.

The output of the comparator 52 drives a controlled switch 54 which can switch off the fan motor when the second value is received, and can allow the motor to remain on if the first value is received.

When the fan is operating, the sensors 42, 43 continuously measure the temperature of the bearings.

The temperatures measured by the sensors 42, 43 are continuously processed by the processing circuit 44, which compares the calculated temperatures with the threshold value $T_1$.

As soon as the temperature T of a bearing exceeds the threshold value $T_1$, a command is sent to stop the fan.

It has been found that stopping the fan when the temperature of a bearing exceeds the predetermined threshold makes it possible to avoid excessive degradation of the bearing and thus to avoid the emission of fumes and/or odours.

Figure 2:
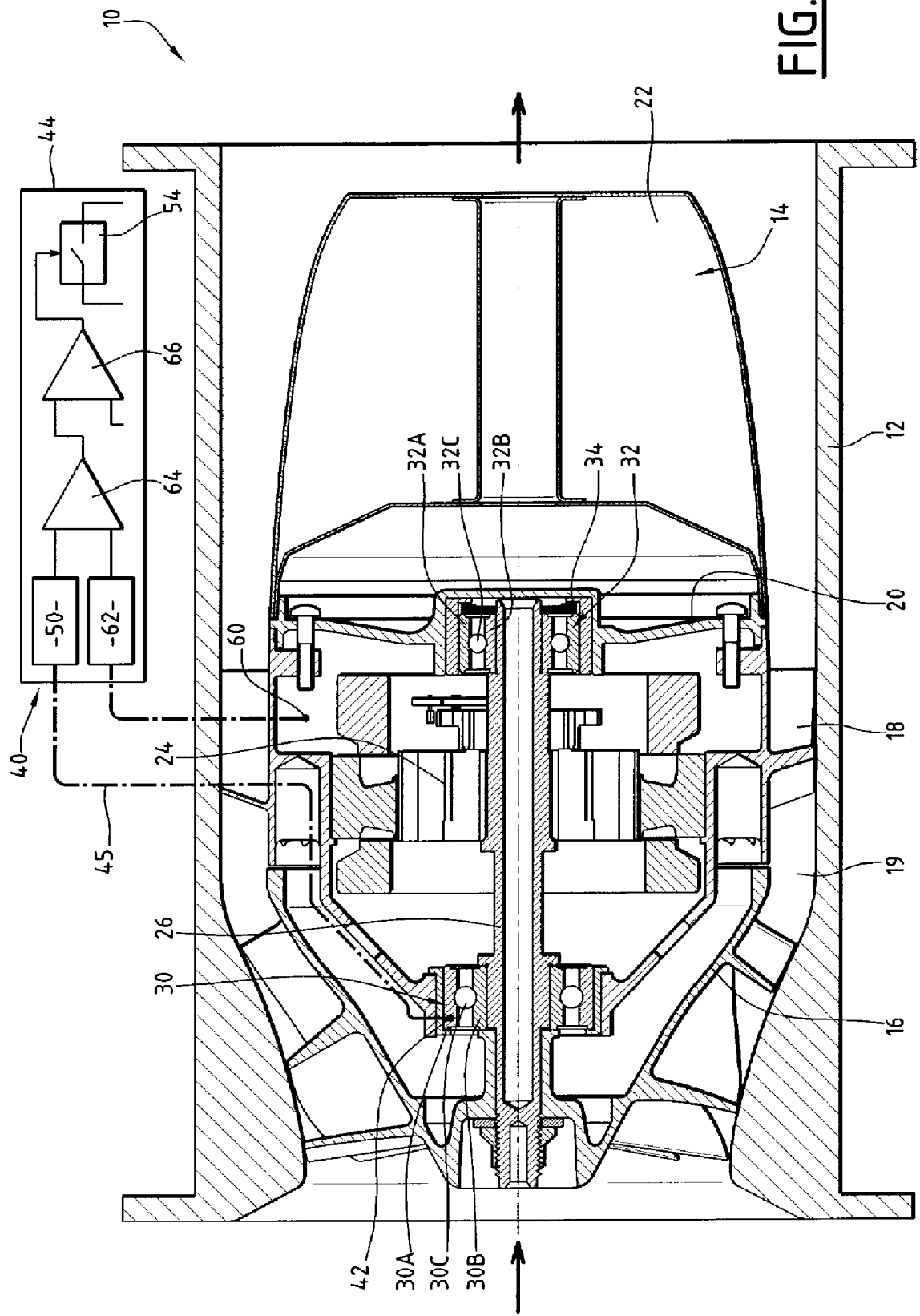
FIG. 2 is a view identical to that of FIG. 1, showing a variant embodiment of the fan of FIG. 1.

In FIG. 2, the fan also has a reference ambient temperature sensor 60 placed at a distance from the bearings but in the vicinity of the motor, so as to measure the ambient temperature of the area where the bearings are located, without measuring the temperature of the bearings themselves.

The processing circuit, also indicated by 44 in this case, differs from that of FIG. 1 in that it also has an ambient temperature calculation module 62 connected to the sensor 60. This module can calculate the ambient temperature in the vicinity of the bearings.

The processing circuit 44 also includes a subtractor 64 for calculating the difference between the temperature measured by the temperature sensor, or each temperature sensor, 42 and the temperature measured by the reference ambient temperature sensor 60.

Finally, it includes a comparator 66 for comparing the temperature difference supplied by the subtractor 64 with a predetermined reference threshold value. This predetermined threshold value is preferably in the range from 40° C. to 80° C.

As in the previous case, when one of the calculated temperature differences exceeds the predetermined threshold value a command is sent to stop the fan, thus avoiding the production of fumes and/or odours.

The invention claimed is:

1. A fan having a support structure, an impeller supported by a shaft coupled to a drive motor, and at least one ball bearing interposed between the shaft and the support structure, the fan having means of monitoring the ageing of the at least one bearings, the means of monitoring the ageing including:
for each ball bearing a respective temperature sensor fitted directly on a race of the at least one bearing in contact with the support structure;
a processing circuit connected to each temperature sensor and capable of providing for each temperature sensor an indicator representing the measured temperature and of evaluating the indicator, with respect to at least one predetermined criterion,
wherein the means of monitoring the ageing include a reference ambient temperature sensor, and in that the processing circuit includes means of comparing the temperature difference between the temperature measured by the temperature sensor or by each temperature sensor and the temperature measured by the reference ambient temperature sensor with a first predetermined threshold value.

2. A fan according to claim 1, wherein the measurement sensor or each temperature sensor is a thermocouple.

3. A fan according to claim 1, wherein the fan has a plurality of bearings interposed between the shaft and the support structure, and in that the monitoring means include a temperature sensor placed on each bearing.

4. A fan according to claim 1, wherein the processing circuit includes means of comparing the temperature measured by the temperature sensor or each temperature sensor with a second predetermined threshold value.

5. A fan according to claim 4, wherein the second predetermined threshold value is in the range from 140° C. to 200° C.

6. A fan according to claim 1, wherein the predetermined threshold value is in the range from 40° C. to 80° C.

7. A fan according to claim 1, wherein the reference ambient temperature sensor is placed in the vicinity of the drive motor of the fan.

* * * * *